UNITED STATES PATENT OFFICE.

AARON C. HORN, OF NEW YORK, N. Y.

PAINT COMPOSITION AND PROCESS OF MAKING SAME.

1,048,536.  Specification of Letters Patent.  Patented Dec. 31, 1912.

No Drawing.   Application filed January 31, 1912.  Serial No. 674,440.

*To all whom it may concern:*

Be it known that I, AARON C. HORN, a citizen of the United States, and a resident of New York, in the county of New York and State of New York, have invented certain new and useful Improvements in Paint Compositions and Processes of Making Same, of which the following is a specification.

This invention relates to paints or coating compositions and relates in particular to coating compositions of the oil and water type, all as more fully hereinafter described and as claimed.

Ordinary "cold water paint" is a dry pulverulent mixture of pigment, extender, and a binder, usually casein, but sometimes glue or other adhesive material of the albuminoid type, or a mineral adhesive such as water glass. In the case of the casein binder a small quantity of an alkali generally is added to render the casein soluble in water, hydrated lime or carbonated alkali being preferred. These paints have the well known disadvantage that they are not resistant to water after application and on outdoor exposure for even brief periods in damp weather the coating flakes and peels. The casein under such conditions is readily attacked by molds and fungi and soon destroyed. The results are the same in the case of interior application to damp walls such as often are found in mills, breweries, cellars and the like. Yet it is in such establishments as these that cold water paints are especially desired, owing both to cheapness and to the flat or matt finish produced.

To render cold water paints less susceptible to the subsequent action of moisture numerous proposals have been made, one of which involves adding to the paint a quantity of an oil, preferably a drying oil as linseed or wood oil. Such additions somewhat improve resistance to moisture but not sufficiently so for extreme service conditions and moreover do not prevent decomposition of the binder by molds and fungi.

The present invention has for its object the production of a ready mixed cold water paint which will be permanent in storage, will form when coated on a surface and allowed to dry an extremely water-resistant coating, remarkably durable, and substantially unaffected by molds and fungi; and yet without the use of more than a moderate amount of oil, so that the desired flat finish may be secured and the cost of manufacture kept at a reasonable figure. For this purpose I select preferably casein as a binder and tung oil as a siccative oleaginous material. I bring the casein into aqueous solution by means of alkaline material and emulsify the oil therewith. To this solution or emulsion I add a suitable waterproofing agent for casein, specifically a chrome salt or other chromium compound, and a small quantity of an acid and a preservative. Pigments are incorporated with this vehicle.

The usual waterproofing agent for casein is formaldehyde in its various active forms, but I have not found this reagent to be really satisfactory for the present purpose. I have however determined that chromium compounds are effective as waterproofers of casein, the action apparently coming into play more extensively only after the coating has been exposed to light, when seemingly the casein and chromium compound combine or further combine in some way to produce a relatively waterproof body. This waterproofing action is further supplemented by the drying oil, which oxidizing, setting and hardening about the particles of casein, renders the surface less absorbent of moisture. The addition of acid after the securement of solution of the casein is most useful and for the following reason among others;—to obtain a solution of the casein and proper distribution of the oil therethrough more alkaline material is required than is actually needed to maintain a stable mixture, once incorporation is effected. The addition of acid after incorporation therefore reduces the alkalinity to a degree which makes it no longer harmful as a saponifying or solvent agent. Hence after the paint has been applied to a surface and allowed to dry, so little alkaline material is then present that the casein becomes even more waterproof and the oil remains free from the disintegrating saponifying action induced by the presence of an amount of alkali normal to ordinary cold water paints.

The preservative which is preferably present in the preferred embodiment of my invention is a condensation product of carbolic or cresylic acid and formaldehyde. Condensation is effected so as to keep a portion or practically all of the phenolic body in an active condition. Extreme condensation should be avoided as thereby the constituents become so firmly united and changed in character that the preservative effect is *nil*. Merely an initial condensation using preferably an excess of the phenol gives the most suitable product. Either an acid or basic condensing body or catalyst may be used. Hydrochloric acid or carbonate of soda are satisfactory. In the case of cresylic acid about two parts by volume should be used to one volume of 40% solution of formaldehyde. Reaction should be allowed to progress in the cold, and in making large batches cooling may be resorted to if necessary, in order to prevent too deep-seated a condensation. Solidification takes place after a few hours and the material may be ground and mixed with the paint composition. Such a solid preservative has the advantage over a liquid or highly soluble preservative, in that it suspends with the pigment better, on which much of the casein is occluded, so that it is available at the point most needed. Also being little affected by water it remains in the coating even after long exposure to wet weather or other moist conditions. The use of such a preservative does not however preclude me from using in addition any of the usual preservatives, such as the fluorids or fluorsilicates, copper salts, ordinary phenol or its sulphonated compounds, and the like. However the condensation product as above indicated has the desired degree of insolubility coupled with very slight odor, so that its points of superiority are several.

The process of this invention and the character of the composition are clearly indicated by the following illustrative formula:—Bring a mixture of casein, five pounds, borax, two pounds, and water, five gallons, to a boil and when the casein has gone well into solution add very gradually three gallons of tung oil with constant stirring. When this mixture has reached the proper degree of homogeneity add three fourths of a gallon of the chrome stock solution made as follows:—one pound each of dichromate of potash and concentrated sulfuric acid are mixed by trituration and three ounces of glucose added. Add water gradually until the acid mixture is diluted to a volume of about nine gallons, which constitutes the chrome stock solution above referred to. The pigment material is preferably ground with silicate of soda and glucose, as thereby the suspending and covering qualities thereof are greatly enhanced To the quantity of the casein and oil mixtures set forth above the following pigment material is used;—twenty pounds of zinc oxid and forty pounds of terra alba are mixed with ½ gallon of ordinary syrupy silicate of soda solution, ⅝ gallon of glucose syrup, 3¾ gallons of warm water and two pounds of the phenol formaldehyde body described above. This yields a paint of rather thin consistency. To obtain more consistent compositions the amount of the vehicle may be reduced.

As stated the formula given is merely illustrative and may be varied within quite wide limits as regards most of the constituents. The degree of alkalinity is however an important consideration and the process as herein carried out, involving solution of the casein and incorporation of the oil, by means of an excess of alkaline material, and subsequent partial neutralization thereof, constitutes a feature of considerable utility. I do not wish to limit myself to the exact procedure employed in accordance with the foregoing, nor to the stipulated ingredients, it being now obvious that various compatible materials may be substituted in whole or in part for some of the ingredients mentioned; and I therefore desire to invoke the doctrine of equivalency insofar as same may be herein applicable. For example glue and other gelatinous bodies and other albuminoid binders, or the salts of tung acid may be substituted for the casein. Tung oil may be replaced by other siccative or semi-siccative oils functioning in substantially the same manner. Borax may give place to other alkaline material having a solvent action on casein in the presence of water. Chromium compounds may be replaced by other fixative agents having the same or substantially the same peculiar combining properties. The neutralizing acid may be hydrochloric or acetic acid or other suitable acidifying agent, such as bisulfate of soda and the like.

Pigments of course may be varied at will, it being understood that colors fast to alkalis are required, as a rule.

The degree of alkalinity of the final composition preferably should not exceed a definite maximum of strength of 0.5% as sodium carbonate; practically a strength of 0.1% or less is desirable and for commercial waterproof paints should generally not be exceeded.

To recapitulate, my invention concerns a waterproof or substantially waterproof water-and-oil paint and the process of making same; said paint comprising a binder such as casein and an oil such as tung oil incorporated with water and an alkaline material, preferably borax; a casein waterproofing agent, specifically a compound of chromium; a saline body, formed by the neutralization by an acid of some of the alkali, preferably being present; also suitable pigment material such as zinc oxid, lithopone, terra alba, and coloring agents as desired; which pigment material and if desired a solid preservative preferably has been ground with water and silicate of soda or glucose or both, prior to incorporation with the vehicle proper; and the process of making said paint or composition which comprises heating casein and the like with an aqueous alkaline solution until solution of the casein is effected, adding a siccative oil to produce an emulsion, then reducing the alkalinity with an acid, adding a solution of a chromium compound, incorporating a pigment and a solid preservative which has been ground in a solution of silicate of soda and glucose or the like and thoroughly mixing the several ingredients, all substantially as described with various modifications and alternatives in the foregoing specification.

What I claim is:—

1. A paint composition comprising casein, siccative oil, water, alkaline material, a saline body having the same base as the alkaline material, a chrome salt, water glass, glucose, and a pigment carrying a substantially oil-and-water insoluble solid preservative.

2. A paint composition comprising casein, tung oil, water, a trace of alkaline material, a neutral saline body, a chrome salt, a pigment and a preservative.

3. A paint composition comprising a proteid binder, tung oil, a proteid fixative, and an oil-and-water insoluble preservative.

4. A paint composition comprising casein, tung oil, a fixative and a preservative containing a condensation product of a phenol.

5. A paint composition comprising casein, tung oil, a modicum of an alkaline material, a basic chromium salt, and water.

6. A paint composition comprising casein, tung oil, a modicum of an alkaline material, basic chromium sulfate, and water.

7. A paint composition comprising casein, tung oil, a modicum of an alkaline material, a chromium salt fixative of a basic character, a pigment, a preservative, and water.

8. The process of making a paint composition which comprises heating casein with an aqueous alkaline solution, adding a siccative oil to produce an emulsion, reducing the alkalinity with an acid, adding a solution of a chromium compound, and then incorporating a pigment.

9. The process of making a paint composition which comprises heating casein with an aqueous alkaline solution, adding a siccative oil to produce an emulsion, reducing the alkalinity to about 0.1% by the addition of an acid, adding a chromium compound, and then incorporating a pigment and a preservative.

Signed at New York city in the county of New York and State of New York this 24th day of January, A. D. 1912.

AARON C. HORN.

Witnesses:
ANNIE GARREGAN,
JOHN F. VIDETO.